Dec. 13, 1949     F. R. FISHER     2,491,099
PROCESS AND APPARATUS FOR THE CATALYTIC
CONVERSION OF HYDROCARBONS
Filed June 11, 1947
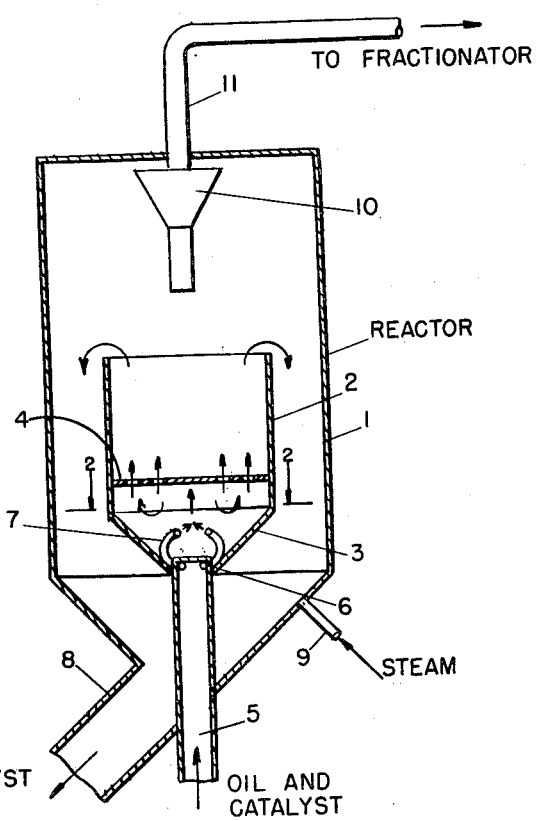
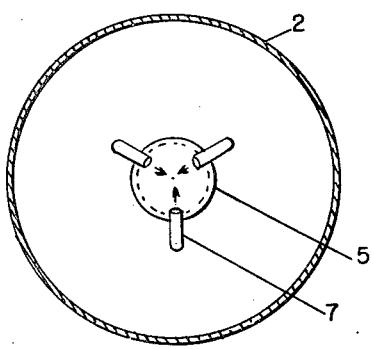
INVENTOR.
FRANK R. FISHER
BY
Pennie, Edmonds, Morton & Barrows
ATTORNEYS Patented Dec. 13, 1949

2,491,099

UNITED STATES PATENT OFFICE 2,491,099

PROCESS AND APPARATUS FOR THE CATALYTIC CONVERSION OF HYDROCARBONS

Frank R. Fisher, Hammond, Ind., assignor to Sinclair Refining Company, New York, N. Y., a corporation of Maine Application June 11, 1947, Serial No. 754,025

8 Claims. (Cl. 196—52)

This invention relates to the pyrolytic conversion of hydrocarbons and, more particularly, to pyrolytic conversion processes involving the use of a finely divided solid catalyst.

The invention is especially applicable to conversion processes of the general type wherein a finely divided catalyst at elevated temperature is suspended in the charge oil passed to a reactor in which conversion of the oil occurs and in which the spent catalyst is separated from the oil vapors, the separated catalyst stripped of oil, regenerated by decarbonizing the catalyst and the regenerated catalyst again suspended in the stream of charge oil passing to the reactor. Operations of the type described are commonly designated fluid catalyst processes.

In conventional fluid catalyst operations, as described, the spent catalyst is passed to the reaction zone in suspension in the charge oil, usually in the vapor phase, and is maintained in a fluidized state in the reactor in contact with the oil vapors during the conversion of the latter.

In order to obtain the maximum yield of the desired reaction product by the use of a given proportion of the catalyst, maximum uniformity of dispersion of the catalyst in the oil vapors passing through the reactor is essential. In conventional practice, the finely divided catalyst entering the reactor is frequently not uniformly dispersed in the oil but is suspended therein in the form of agglomerates, or clusters, of the fine catalyst particles. Under such conditions, maximum and uniform contact between the hydrocarbon vapors and the catalyst is not attained in the reaction zone, with the result of lower efficiency of the desired conversion reaction. More uniform contact between the catalyst and oil vapors in the reactor is promoted if the catalyst is more uniformly dispersed in the entering charge oil.

The present invention provides improvements in conversion operations of the fluid catalyst type whereby a more thorough and more uniform contact of the cataylst with the oil vapors in the reaction zone is assured. The invention further provides improved apparatus especially adapted to the carrying out of the process.

In accordance with my present invention, the suspension of the catalyst in hydrocarbon vapors to be converted, for instance, a suspension of freshly regenerated catalyst formed in the customary manner, is, upon entering the reaction zone, or prior thereto, separated into a plurality of streams, advantageously three or more, and these streams are directed, at high velocity, toward a common point so that the streams impinge on one another at high velocity causing a zone of high turbulence and high shearing forces. By these conditions, agglomerates, or clusters, of the catalyst particles are torn apart and the finely divided catalyst particles are uniformly dispersed in the hydrocarbon vapors.

As just noted, this dispersion step may be effected prior to the introduction of the suspension to the conversion chamber but is, with advantage, effected just as the catalyst enters the conversion zone.

A particularly advantageous method and means for effecting uniform conversion of the hydrocarbons is to provide a smaller chamber, coaxially positioned within an enlarged vertically elongated conversion chamber and in open communication therewith at its upper end. This smaller chamber is, with advantage, partitioned by a generally horizontally positioned perforated plate or grid so as to form an upper and a lower zone in the smaller chamber. The conduit through which the suspension is passed to the conversion zone is brought into the lower zone of the smaller chamber and the suspension is injected into the lower chamber as a plurality of opposing high velocity streams or jets, as just described, the jets, with advantage, being directed somewhat upwardly so that, following the impact of the several streams, the composite stream of highly dispersed catalyst and oil vapors will flow generally upwardly against the center portion of the perforated plate delineating the upper and lower zones of the smaller chamber.

The center portion of the plate, against which the composite stream impinges, is, with advantage, solid, the remainder of the plate being perforated so that the rising composite stream of the suspension is deflected downwardly by the imperforate portion of the plate and flows outwardly and upwardly through the perforated portions of the plate into the upper zone of the small inner chamber of the reactor. There, the catalyst tends to drop out of suspension forming a dense phase body of the fluidized catalyst which overflows into the outer chamber of the reactor.

The invention will be further described and illustrated with reference to the accompanying drawings which represent conventionally and diagrammatically a particularly advantageous embodiment of my invention and of which—

Figure 1 is a vertical, sectional view of the apparatus, and

Figure 2 is a somewhat enlarged horizontal sectional view of the innermost chamber, along the lines 2—2 of Figure 1.

The apparatus indicated by the reference numeral 1 of the accompanying drawing represents a generally cylindrical vertically elongated reaction chamber. Coaxially positioned within the chamber 1 is a smaller inner chamber 2, open at its upper end and having a cone-shaped bottom, as indicated at 3. The chamber 2 is divided into an upper and lower zone by plate or grid 4, perforated with the exception of its center portion. A conduit 5 enters the lower end of chamber 2, terminating therein in a manifold 6 with tubes 7 of restricted transverse area passing therefrom and curved generally upwardly and inwardly as shown in the drawing, so as to direct the effluent therefrom toward a common point.

In operation, the suspension of catalyst and oil vapors enters the reactor through conduit 5 and passes through manifold 6 and, from thence, through tubes 7, as high velocity streams, directed toward one another so that the streams will meet with considerable violence, as previously described.

The united stream of the suspension passes upwardly and strikes against the central, imperforate portion of plate 4 and is deflected downwardly and outwardly and passes upwardly through the perforations in plate 4 into the upper zone of chamber 2.

In chamber 2, the catalyst tends to drop out of suspension, forming a relatively dense phase body of fluidized catalyst which accumulates therein and overflows from the inner chamber into the surrounding annular zone of chamber 1, gravitating downwardly therethrough into the lower end of chamber 1 from which it is withdrawn through conduit 8 to a stripping or regenerating zone.

Where desired steam, or other gaseous stripping medium, may be injected into the lower end of chamber 1 through line 9, evenly distributed therein by known means and passed upwardly through the downwardly gravitating bed of catalyst, stripping therefrom readily vaporizable hydrocarbons.

Hydrocarbon vapors, products of the conversion, pass from the upper end of the reactor through a cyclone type separator, diagrammatically represented at 10, for the separation of suspended catalyst and, from thence, through conduit 11 to fractionating apparatus, not shown.

As previously noted, the disperson of the catalyst into oil vapors may be effected prior to introduction to the reactor. For instance, a chamber may be interposed in the elevator conduit leading from the regenerator to the reactor and the highly dispersed catalyst in oil vapors may pass therefrom to a reactor of conventional type.

The catalyst employed may be of the type conventionally used in fluid catalyst processes, for instance, a silica-alumina type catalyst in finely divided or powdered form. The reaction temperature and pressure conditions may, likewise, be those conventionally used in operations of this type and, as understood by the art, the optimum temperatures and pressures will depend primarily upon the type of feed stock used, the particular catalyst employed and the reaction desired. The invention contemplates the use of known methods and means for regenerating the catalyst and for stripping and conveying the catalyst through the system.

In cracking gas oil, for instance, the temperature maintained within the reaction zone may, with advantage, be within the range of 800° to 1,000° F. and the pressure at the top of the reactor within the range of 5 to 25 pounds per square inch. Advantageously, the suspension of catalyst and charge oil is passed to the reactor under considerable pressure so as to effect high velocity and rather violent impact of the suspension passing from tubes 7.

It will be understood that the invention is not restricted with respect to any particular type of fluid catalyst process but is applicable to various modifications of fluid catalyst operations in which the catalyst in finely divided form is brought into intimate contact with hydrocarbon vapors in a reaction zone maintained at conversion temperatures.

I claim:

1. In the fluid catalyst process for the conversion of hydrocarbons wherein the finely divided catalyst at an elevated temperature is brought into intimate contact with hydrocarbon vapors to be converted in a conversion zone, the step of passing the catalyst in suspension in hydrocarbon vapors to be converted at high velocity into a zone dispersed phase catalyst suspension as a plurality of separate streams so directed as to converge at a common point within said zone so that the streams impinge on one another at high velocity causing a zone of high turbulence and high shearing forces and passing the resultant suspension through the conversion zone.

2. In the fluid catalyst process for the conversion of hydrocarbons wherein the finely divided catalyst at an elevated temperature is brought into intimate contact with hydrocarbon vapors to be converted in a conversion zone, the step of passing the catalyst in suspension in hydrocarbon vapors to be converted at high velocity into a chamber as a plurality of separate streams so directed as to converge at a common point so that the streams impinge on one another at high velocity causing a zone of high turbulence and high shearing forces, causing the resultant composite stream of the suspension to impinge against a solid surface and then passing the suspension through the conversion zone.

3. In the fluid catalyst process for the conversion of hydrocarbons wherein the finely divided catalyst at an elevated temperature is brought into intimate contact with hydrocarbon vapors to be converted in a conversion zone, the step of passing the catalyst in suspension in hydrocarbon vapors to be converted at high velocity into the conversion zone as a plurality of separate streams so directed as to converge at a common point so that the streams impinge on one another at high velocity causing a zone of high turbulence and high shearing forces, causing the resultant composite stream of the suspension to impinge upon a solid surface and then passing the suspension through the conversion zone.

4. In the fluid catalyst process for the conversion of hydrocarbons wherein the finely divided catalyst at an elevated temperature is brought into intimate contact with hydrocarbon vapors to be converted in a conversion zone, the step of passing the catalyst in suspension in hydrocarbon vapors to be converted at high velocity into a zone of dispersed phase catalyst suspension as at least three separate streams so directed as to converge at a common point within said zone so that the streams impinge on one another at high velocity causing a zone of high turbulence and high shearing forces and passing the resultant suspension through the conversion zone.

5. Apparatus of the type described which comprises a vertically elongated chamber, a conduit leading from the lower end of said chamber, a second chamber coaxially positioned in the first chamber and opening at its upper end into the first chamber, a perforated partition dividing the inner chamber into an upper and a lower zone, a conduit leading into the lower zone and terminating therein in a manifold, a plurality of smaller tubes leading from said manifold, the exit ends of the tubes being directed toward a common point, and a conduit leading from the upper end of the outer chamber.

6. Apparatus of the type described which comprises a vertically elongated, generally cylindrical chamber having a hopper bottom, a conduit leading from the hopper bottom, a second generally cylindrical chamber coaxially positioned in the first chamber and opening at its upper end into the first chamber, a perforated, generally horizontal partition having an imperforate center portion dividing the inner chamber into an upper and a lower zone, a conduit leading upwardly into the lower zone and terminating therein in a manifold and a plurality of smaller tubes leading from said manifold, the exit ends of the tubes being directed toward a common point at a somewhat higher elevation than the exit ends of the tubes and directly beneath the center imperforate portion of the partition.

7. Apparatus of the type described which comprises a reaction chamber having an upper zone and a lower zone separated by a perforated partition member, a conduit leading into the lower zone of said chamber and terminating therein in a manifold and a plurality of smaller tubes leading from said manifold, the exit ends of said tubes being directed generally upwardly toward a common point in the lower zone of said chamber.

8. Apparatus of the type described which comprises a reaction chamber, a second chamber communicating with a lower zone of the reaction chamber, a conduit leading into said second chamber and terminating therein in a manifold and a plurality of smaller tubes leading from said manifold, the exit ends of the tubes being directed toward a common point within said chamber.

FRANK R. FISHER.

REFERENCES CITED

The following references are of record in the file of this patent:

UNITED STATES PATENTS

| Number | Name | Date |
| --- | --- | --- |
| 1,075,678 | Wall | Oct. 14, 1913 |
| 2,086,180 | Bonotto | July 6, 1937 |
| 2,394,651 | Althers | Feb. 12, 1946 |
| 2,412,152 | Huff | Dec. 3, 1946 |
| 2,415,755 | Ogorzaly | Feb. 11, 1947 |
| 2,430,443 | Becker | Nov. 11, 1947 |